(12) United States Patent
Christenson

(10) Patent No.: US 7,802,492 B2
(45) Date of Patent: Sep. 28, 2010

(54) CAST CRANKSHAFT DAMPER ASSEMBLY

(75) Inventor: Bruce G. Christenson, Canton, MI (US)

(73) Assignee: Metavation, LLC, Wilmington, DE (US)

( * ) Notice: Subject to any disclaimer, the term of this patent is extended or adjusted under 35 U.S.C. 154(b) by 159 days.

(21) Appl. No.: 11/934,232

(22) Filed: Nov. 2, 2007

(65) Prior Publication Data

US 2008/0105080 A1 May 8, 2008

Related U.S. Application Data

(60) Provisional application No. 60/864,645, filed on Nov. 7, 2006.

(51) Int. Cl.
*F16F 15/12* (2006.01)

(52) U.S. Cl. ...................................... 74/574.4

(58) Field of Classification Search ................ 74/572.2, 74/574.4; 188/379; *F16F 15/12*
See application file for complete search history.

(56) References Cited

U.S. PATENT DOCUMENTS

| | | | | |
|---|---|---|---|---|
| 2,163,022 A | * | 6/1939 | Campbell | ..................... 164/95 |
| 2,972,904 A | * | 2/1961 | Troyer | ........................ 74/574.4 |
| 3,479,907 A | * | 11/1969 | Hall | ........................... 74/574.4 |
| 7,171,750 B2 | * | 2/2007 | Kano | ........................ 29/896.93 |
| 2002/0096245 A1 | * | 7/2002 | Christenson et al. | ......... 156/165 |
| 2006/0272446 A1 | * | 12/2006 | Cortright et al. | ............ 74/574.4 |
| 2008/0034918 A1 | * | 2/2008 | Manzoor et al. | ............ 74/574.4 |

* cited by examiner

*Primary Examiner*—Richard W Ridley
*Assistant Examiner*—Alan B Waits
(74) *Attorney, Agent, or Firm*—Wood, Herron & Evans, L.L.P.

(57) ABSTRACT

A hub for a vibration damper is formed by shell casting. The hub includes an outer annular surface or rubber diameter. In the casting of the part, the part line is formed along the center of this outer annular surface. The casting gate is also formed on the outer annular surface. The part line divides the outer annular surface into two halves. The surface of these two halves slope slightly away from the part line. When assembled, the elastomeric strip is located between the outer annular surface and inertia ring with edges of the elastomeric member extending up to edges of said casting gate. This, in combination with the different draft angles, maintains the elastomeric member in position during use.

5 Claims, 2 Drawing Sheets

CAST CRANKSHAFT DAMPER ASSEMBLY

BACKGROUND OF THE INVENTION

Torsional vibration dampers are employed extensively in internal combustion engines to reduce torsional vibrations delivered to rotatable shafts. The torsional vibrations may be of considerable amplitude, and, if not abated, can potentially damage gears or similar structures attached to the rotatable shaft and cause fatigue failure of the rotatable shaft.

Torsional vibration dampers convert the kinetic vibrational energy by dissipating it to thermal energy as a result of damping. The absorption of the vibrational energy lowers the strength requirements of the rotatable shaft and thereby lowers the required weight of the shaft. The torsional vibration damper also has a direct effect on inhibiting vibration of nearby components of the internal combustion engine that would be affected by the vibration.

The simplest insertion style torsional vibration damper has three components, a hub that allows the damper to be rigidly connected to the source of the vibration, an inertia ring, and an elastomeric strip in the same shape as the ring. The elastomeric strip provides the spring dashpot system for the damper. Typically, the hub and the inertia ring are manufactured individually and machined before the elastomer is inserted by force into the gap that is present between the hub and the inertia ring. The elastomer is compressed and exerts a pressure between the metallic surfaces of the ring and hub, holding the assembly together. There are several design problems with these dampers.

The hub of the crankshaft damper can be formed in a variety of different matters, and, in particular, can be cast. Various casting methods can be used. Shell casting utilizes two mold halves that are combined together and filled with molten metal. This casting method will inherently leave a parting line where the two mold halves join. Further, this molding technique causes the formation of a casting gate, which is an imperfection or boss located where the metal is poured into the mold. In the past, such cast hubs had to be machined prior to assembly.

SUMMARY OF THE INVENTION

The present invention is premised on the realization that a hub used to form a torsional vibration damper, such as a crankshaft damper, can be formed by shell casting and without machining of the cast part prior to assembly. The damper includes a hub and an annular weight or ring with a rubber strip positioned on the outer annular surface of the hub between the hub and ring. The two ends of the rubber strip abut the two edges of a casting gate on this annular surface. The casting gate increases the resistance to rotational slippage of the outer annual weight of the damper relative to the hub.

By forming the parting line along the center of the outer annular surface of the hub and altering the draft angle from the two sides of the mold, one can further facilitate retention of the rubber between the weight and the outer annular surface of the hub.

The objects and advantages of the present invention will be further appreciated in light of the following detailed description and drawings in which:

DETAILED DESCRIPTION

Figure 1:
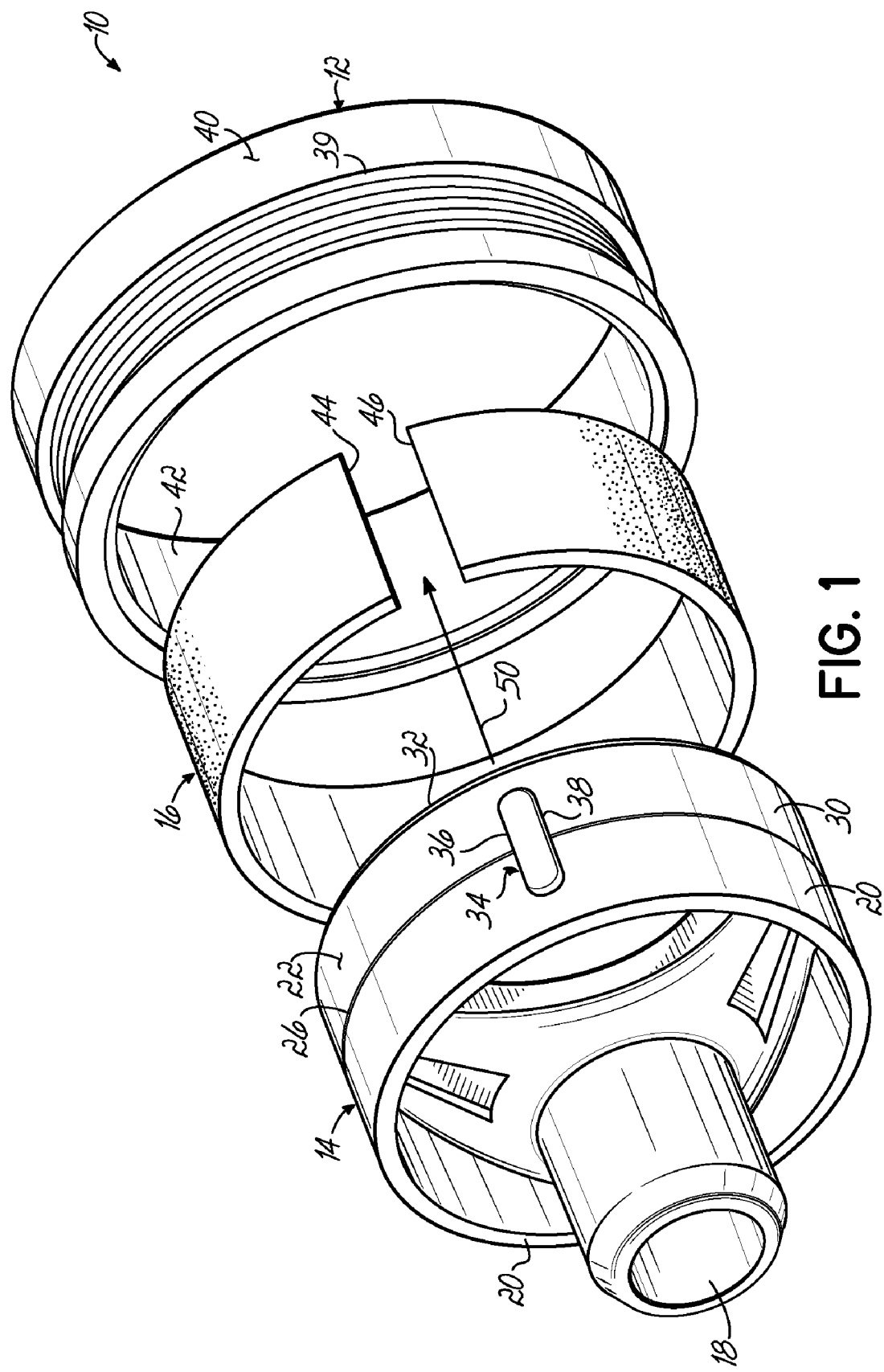
FIG. 1 is an exploded view of the present invention.
Figure 2:
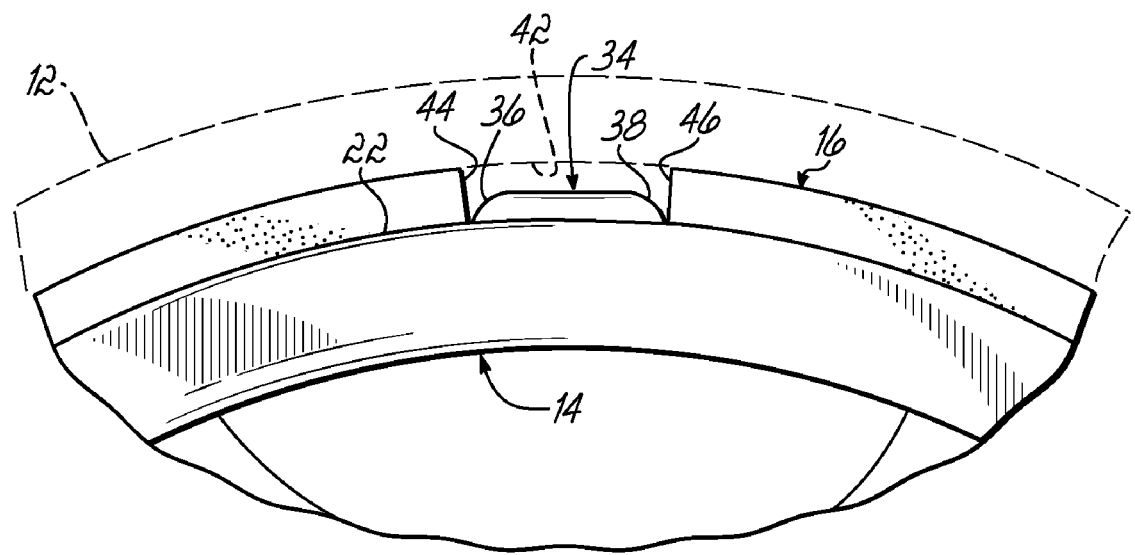
FIG. 2 is an enlarged view of the casting gate area.

As shown in FIG. 1, the present invention is a torsional vibration damper 10, which includes an inertia ring 12, a hub 14, and an elastomeric strip 16. The hub 14, as shown, includes a central inner hub 18 adapted to attach to the crankshaft of an engine. Extended from the inner hub 18 are spokes 19 that entend to an outer annular member 20. The annular member 20 includes an outermost surface 22 also referred to as the rubber diameter.

Figure 3:
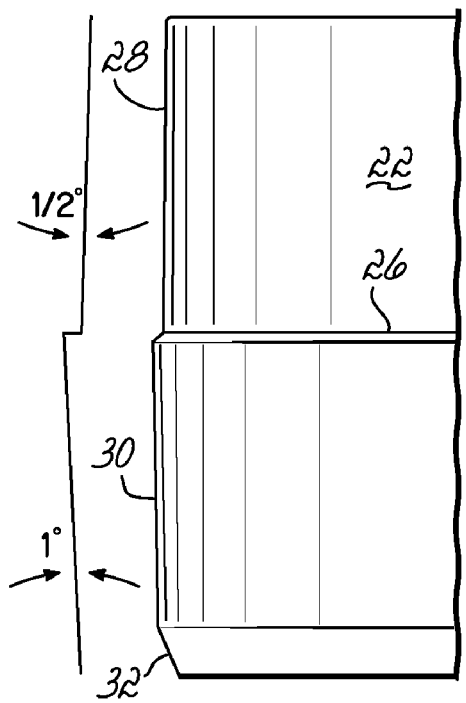
FIG. 3 is a cross sectional view taken at lines 3-3 of FIG. 1.

The hub 14 is prepared by shell casting wherein two mold halves, having an interior cavity that is the same as the exterior configuration of hub 14, are put together and filled with molten metal which then solidifies to form the hub 14. This inherently leaves a part line where the two mold halves join. That part line 26 lies along the center of the outer surface 22. This divides the outer surface 22 into a first half 28 and a second half 30. As shown in FIG. 3, each of these halves has a slight casting draft angle. Half 28 has a draft angle of about ½° to about 2°, with about ½° being preferred. The second half 30 has a draft angle of about ½° to about 2°, with about 1° being preferred. As shown in the drawings, the draft angle is measured relative to a line parallel to a central axis of the damper. Further, as can be seen in FIG. 3, one edge 32 of outer annular member 20 is beveled to facilitate insertion of the elastomeric strip 16.

Located in the center of the outer annular member 20 is a casting gate 34, which is where the metal was poured into the mold. As shown, the casting gate 34 has its long axis perpendicular to the outer annular member 20 and part line 26. Generally, this casting gate will extend above the annular surface 22, approximately about 1 to about 2 mm.

The inertia ring 12 is formed by any standard method such as by casting, or the like. Belt grooves 39 can then be machined into the outer surface 40 of the inertia ring 12.

The elastomeric member can be formed from a wide variety of elastomers including chlorobutyl rubber, bromobutyl rubber, butyl rubber, EPDM, nitrile rubber, and the like. This is molded to size. It can also be formed by extrusion and cut to size.

The vibration damper is assembled by forcing the rubber strip 16 between the inner surface 42 of the inertia ring 12, and the outer annular surface 22 of the hub 14. More particularly, the inertia ring 12 is placed over the hub and the rubber strip 16 is forced into a gap between the two. The strip is positioned so that the ends 44 and 46 are located adjacent edges 36 and 38 of casting gate 34.

Strip 16 is forced between inertia ring 12 and hub 14 in the direction shown by arrow 50, so that it passes over the beveled edge 32, subsequently over the second half 30 of outer surface 22, and, finally, across to the first half 28. The uncompressed thickness of the rubber strip 16 should be about 1.3-1.5 times the width of the gap between the hub and the inertia ring 12. Thus, the elastomeric ring will be under approximately 30% compression or more.

The design of the outer surface 22, in turn, acts to maintain the elastomeric member in position between the hub and the inertia ring and reduce the risk of failure. The parting line 26 in combination with the differing draft angles will deter the rubber strip 16 from sliding out from between the inertia ring 12 and the hub 14. The casting gate 34 will prevent radial movement of the rubber strip 16 relative to the outer surface 22 of hub 14.

This hub design allows the hub 14 to be used as cast with virtually no machining prior to assembly. Further, this design prevents both axial and radial displacement of rubber strip 16. Accordingly, the present invention not only reduces assembly cost, but also increases reliability by preventing movement of the rubber strip relative to the assembled hub.

This has been a description of the present invention along with the preferred method of practicing the present invention. However, the invention itself should only be defined by the appended claims, Wherein we claim:

1. A vibration damper having a cast metal hub surrounded by an inertia ring with a rubber strip between said inertia ring and said hub, said hub having an outer annular surface said outer annular surface having a casting gate wherein said rubber strip has first and second ends abutting first and second edges of said casting gate, wherein said rubber strip extends from a first edge of said casting gate around said outer annular surface to said second edge of said casting gate.

2. The vibration damper claimed in claim 1 wherein said outer annular surface includes a part line.

3. The vibration damper claimed in claim 2 wherein said part line divides said outer annular surface into first and second halves wherein said first half has a draft angle of ½° to 2° and wherein said second half has a draft angle of ½° to about 2°, both angles measured extending from said part line and relative to a line parallel to an axis of said damper.

4. A vibration damper having a cast metal hub having an outer annular surface, an inertia ring and a rubber strip between said outer annular surface and said inertia ring wherein said outer annular surface includes a part line extended radially around said outer annular surface, wherein said part line divides said annular surface into first and second halves and wherein said first half has a draft angle of ½° to 2° and wherein said second half has a draft angle of ½° to 2°, both angles measured extending from said part line and relative to a line parallel to an axis of said damper.

5. The vibration damper claimed in claim 4 wherein said outer surface further includes a casting gate and wherein said rubber strip extends from a first edge of said casting gate around said outer annular member to a second edge of said casting gate.

* * * * *